Feb. 16, 1960 F. A. SCHULTZ 2,924,850

DIE FOR MOLDING BLOCKS ONTO A PLURALITY OF LATERALLY DISPOSED WIRES

Filed Jan. 9, 1958 2 Sheets-Sheet 1

INVENTOR
F. A. SCHULTZ
BY C. B. Hamilton
ATTORNEY

INVENTOR
F. A. SCHULTZ
BY C. B. Hamilton
ATTORNEY

United States Patent Office
2,924,850
Patented Feb. 16, 1960

2,924,850

DIE FOR MOLDING BLOCKS ONTO A PLURALITY OF LATERALLY DISPOSED WIRES

Frank Arthur Schultz, La Grange, Ill., assignor to Western Electric Company, Incorporated, New York, N.Y., a corporation of New York Application January 9, 1958, Serial No. 707,915
3 Claims. (Cl. 18—36)

This invention relates to molding dies and more particularly to a die for molding blocks of dielectric material onto a plurality of precisely aligned laterally disposed wires.

In the manufacture of some electrical components, particularly wire block assemblies for use in what are known as wire spring relays, a number of flexible wires are positioned in parallel, side by side relation in a die and plasticized dielectric molding material is forced into the die to form mounting blocks about portions of the wires. In the use of such dies, considerable difficulty has been experienced in that the molding material which is forced into the die under high pressures, tends to displace the relatively flexible wires from their predetermined precise position in which they are placed in the die.

An object of the present invention is to provide an improved die for molding blocks of dielectric material onto a plurality of laterally spaced conductors without distorting them.

A die illustrating certain features of the invention may include a pair of die members which support the conductors therebetween and have cooperating recesses forming a plurality of cavities for forming dielectric blocks around the conductors. The portions of the die members between the cavities are shaped to support the conductors in precise position against lateral displacement due to the flow of molding material into the cavities and to provide openings between adjacent cavities and between adjacent wires for the passage of the molding material from one cavity to another parallel to the conductors. The molding material is fed into one of the cavities which serves as a runner for distributing the material transversely of the conductors, after which the molding material flows through the openings into successive cavities in a direction parallel to the conductors.

Other objects and advantages of the invention will become apparent by reference to the following detailed description thereof and the accompanying drawings, in which Figs. 1 and 2 are enlarged fragmentary plan and side elevational views, respectively, of a wire block assembly molded in the die embodying the present invention;

Figures 8, 9, 10:
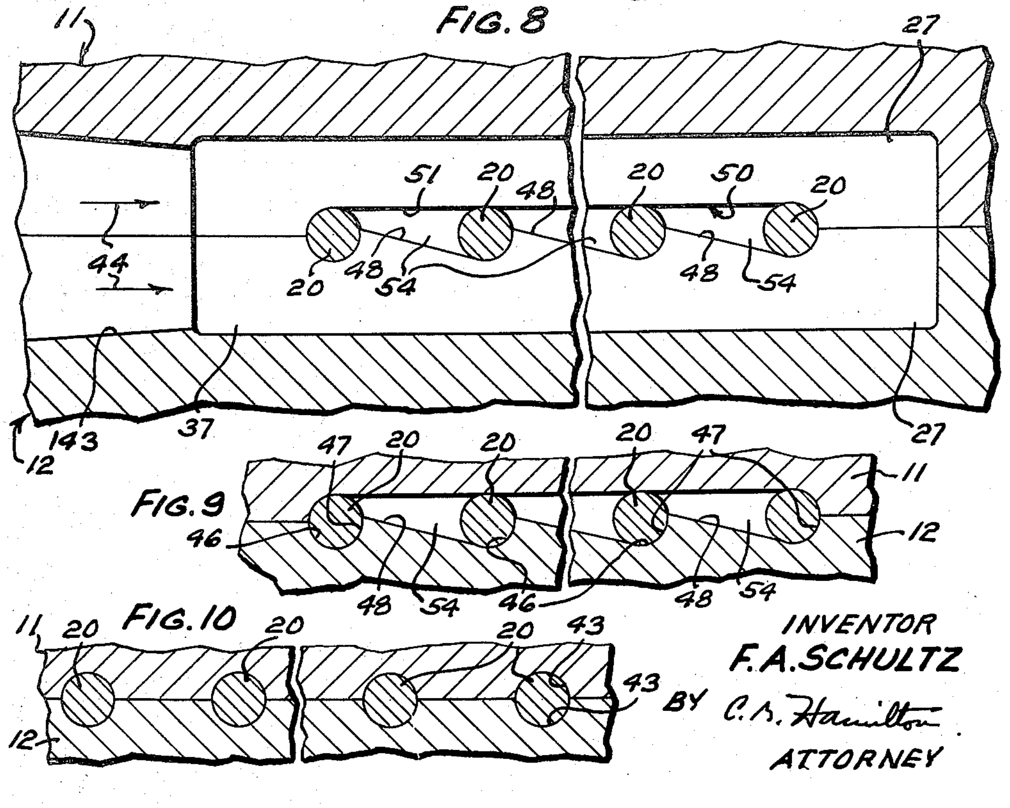
Figure 4:
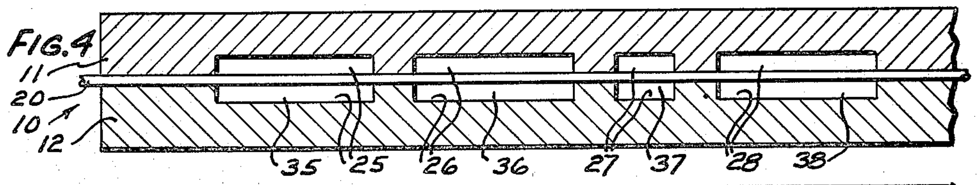
Fig. 4 is a vertical longitudinal sectional view of the molding die taken on line 4—4 of Fig. 7 and showing a wire therein in position to have the dielectric material molded therearound.
Figures 5, 6:
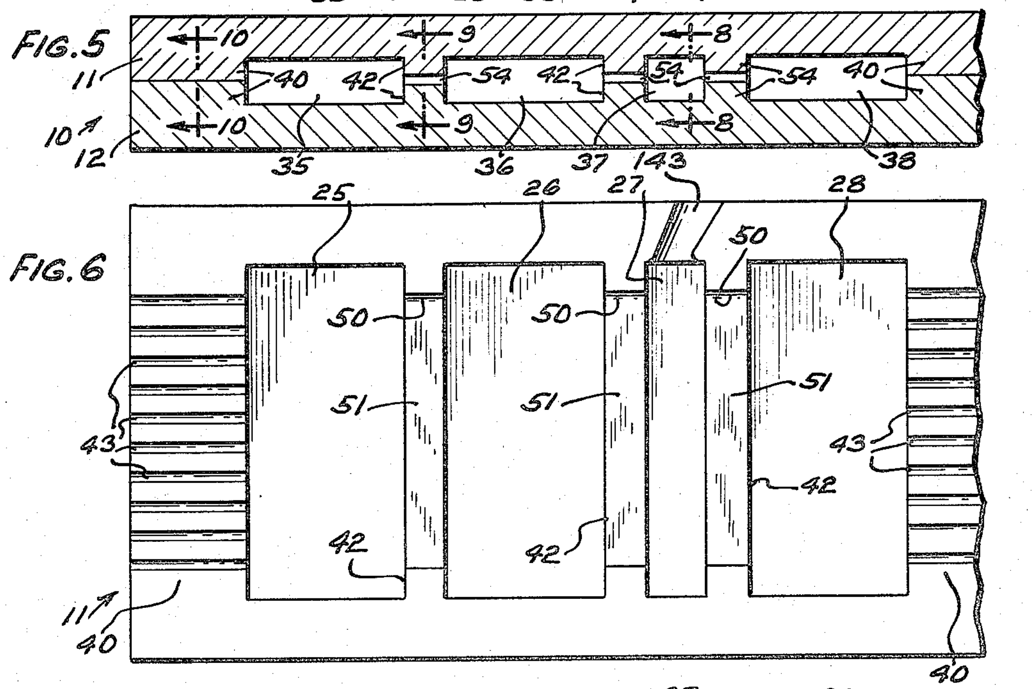
Fig. 5 is a vertical longitudinal sectional view through the molding die taken on line 5—5 of Fig. 7.
Fig. 6 is a fragmentary face view of the upper die section.

Figs. 8, 9 and 10 are enlarged fragmentary vertical cross sectional views of the molding die taken on lines 8—8, 9—9 and 10—10, respectively, of Fig. 5.

Figure 1:
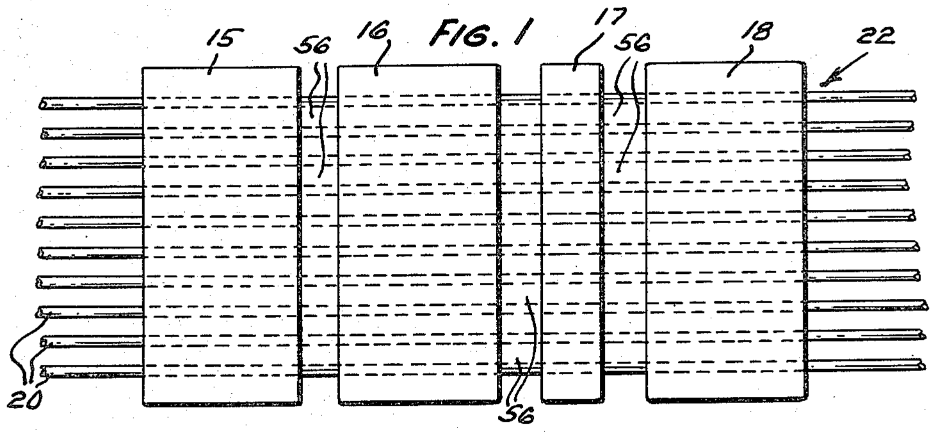
Figure 2:
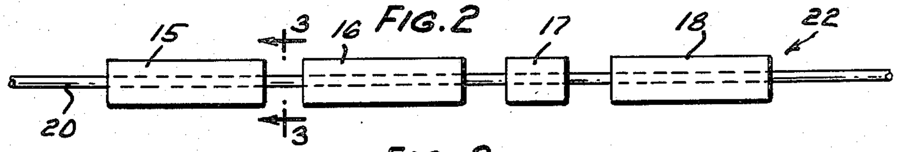
Figure 7:
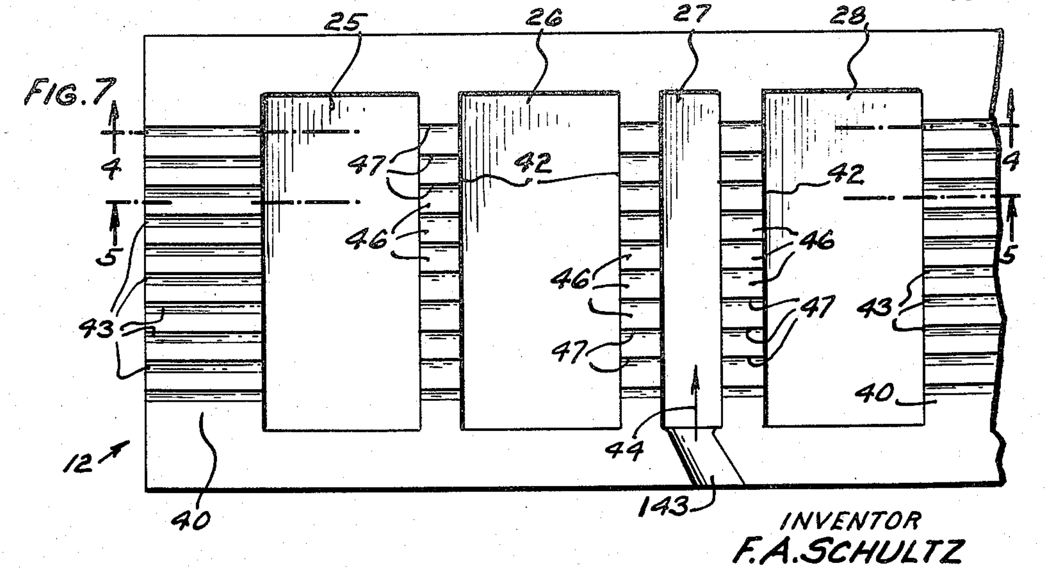
Fig. 7 is a fragmentary plan view of the lower die section.

Referring to the drawings, the present die 10 comprises upper and lower cooperable die members 11 and 12 for molding blocks 15, 16, 17 and 18 of dielectric material (Figs. 1 and 2) around longitudinally spaced portions of a row of laterally spaced parallel wires 20 to form a block assembly or component 22 of a wire spring relay. The die members 11 and 12 have flat mating surfaces and are provided with elongated recesses 25, 26, 27 and 28 which cooperate to form mold cavities 35, 36, 37 and 38 for forming the dielectric blocks 15, 16, 17 and 18 around the wires 20. As seen in Figs. 6 and 7, the recesses 15—18 extend transversely of the die members 11 and 12 and are disposed in spaced relation to each other longitudinally of the die members and are bounded in part by end portions or walls 40 and intermediate spacer walls or partitions 42. Laterally spaced longitudinally directed parallel grooves 43 on the end walls 40 of the die members engage longitudinally spaced portions of the wires 20 and support them in predetermined parallel positions in the mold cavities.

The partitions 42 of the died members 11 and 12 also are shaped to support spaced intermediate portions of the wires 20 against lateral displacement in the die and to provide longitudinally directed openings in the die members between the mold cavities 35—38 and between the wires 20 for movement of the plastic molding material from one cavity to another parallel to the wires 20. The molding material is forced into the mold cavity 27 through an orifice 143 formed in the die members 11 and 12 (Figs. 6, 7 and 8) and extending from one end of the cavity. This cavity 27 serves as a runner for conducting the molding material transversely of the die across the wires 20 therein in a direction indicated by the arrows 44 (Figs. 6–8).

In the lower die member 12, the partitions 42 have laterally spaced longitudinally directed cylindrical recesses 46 formed therein for engaging the wires 20 along a substantial peripheral portion thereof on the bottom of the wires and to either side of vertical planes through the axes of the wires. Shoulders 47 formed on the partitions 42 hold the wires against horizontal displacement in the direction 44 of transverse movement of the molding material in the cavity 27. Sloping surfaces 48 extending tangentially from the recesses 46 to the upper edges of the adjacent shoulders 47 hold the wire against lateral horizontal displacement in the opposite direction.

In the upper die member 11, the partitions 42 have relatively wide shallow grooves 50, which are adapted to receive all of the wires 20 therein and which have flat surfaces 51 engageable with the wires 20 for maintaining them in the recesses 46 of the lower die member 12 and cooperable therewith to hold them against vertical displacement. The recesses 50 are curved at their ends 52 for engaging the end wires of the row of wires 20. As seen in Figs. 8 and 9, the openings 54 thus formed in the partitions between the wires 20 serve as passageways between adjacent mold cavities for the movement of plastic molding material from one mold cavity to another in a direction parallel to the wires 20.

Figure 3:
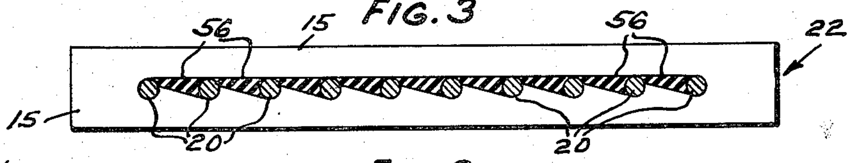
Fig. 3 is an enlarged cross sectional view of the block assembly taken on line 3—3 of Fig. 2 and showing a web of molded material extending between the wires of the comb.

It will be noted from an inspection of Figs. 4–7 that the runner cavity 27 is relatively narrow and that the partitions 42 on opposite sides thereof are sufficiently close together to support the wires 20 against the force of the moving molding material being injected into the cavity 27 and prevent the wires from being bent. After the molding material has filled the cavity 27, it is forced longitudinally of the die through the passageways 54 in the partitions 42 into the cavities 26 and 28 and from the cavity 26 through the passageways 54 into the mold cavity 25. Molding material in the passageways 54 of the dies during the molding of a block assembly 22 form webs 56 (Figs. 1 and 3) thereon extending between adjacent blocks 15—18 and between adjacent wires 20. These webs are of less thickness than the diameter of a wire 20 and are confined between planes tangent with the upper and the lower portions of the wires.

With this design of molding die for supporting the wires at a plurality of longitudinally spaced portions to withstand deformation by the transverse force of the molding material as it is injected into the die and for effecting longitudinal movement of the molding material from one mold cavity to another through passageways in the die disposed between the wires, it is possible to mold the blocks of dielectric material around parallel straight wires 20 without deforming or displacing them.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. A die for molding blocks of dielectric material onto a group of laterally spaced straight wires which comprises a pair of cooperating die members having mating surfaces and having cooperating recesses forming a plurality of mold cavities disposed in longitudinally spaced relation to each other and bounded in part by traversely directed intermediate walls and end walls of the die members, said end walls having a plurality of mating grooves for supporting the straight wires in space and parallel relation to each other in said mold cavities and said intermediate walls having surfaces shaped to engage longitudinally spaced portions of the wire between adjacent mold cavities for supporting the wire against transverse movement relative to each other and to provide longitudinally directed passageways between adjacent mold cavities and between the wires for movement of the molding material from one cavity to another, and said die members being shaped to provide an orifice communicating with one of said cavities for conducting the molding material thereinto.

2. A die for molding blocks of dielectric material onto a group of laterally spaced straight wires comprising a pair of die members having mating surfaces and having a plurality of longitudinally extending cooperating grooves at each end thereof for supporting the straight wires in laterally spaced and parallel relation to each other, said die members having a plurality of mating recesses forming mold cavities extending transversely of the die and spaced from each other longitudinally of the die by mating partitions, said partitions being shaped to engage longitudinally spaced portions of the wire and support them against lateral displacement and to form passageways between the wires and between adjacent mold cavities for the flow of molding material from one cavity to another, and said die members having an orifice communicating with one end of an intermediate one of the cavities for conducting the molding material thereinto.

3. A die for molding blocks of dielectric material onto a row of laterally spaced straight wires which comprises a pair of cooperable die members having mating surfaces and having cooperating recesses forming a plurality of mold cavities, said mold cavities being disposed in spaced relation to each other longitudinally of the die and bounded in part by end walls and intermediate walls, said end walls having a plurality of mating grooves for supporting the straight wires in spaced and parallel relation to each other in said mold cavities, the intermediate walls of one die member having grooves conforming to portions of the wires for supporting the wires therein against lateral movement toward or from one another parallel to said mating surfaces of the die members and against lateral movement in one direction perpendicular to said mating surfaces, the intermediate walls of the other die member having wide shallow grooves provided with flat surfaces parallel to the mating surface of said die member for engaging all of the wires to hold them in the grooves in the intermediate walls of the other die member and to provide passageways through the intermediate walls and between the wires for movement of the plastic molding material from one mold cavity to another, and said die members being shaped to provide an orifice communicating with one of said cavities for conducting the molding material thereinto.

References Cited in the file of this patent

UNITED STATES PATENTS

| | | |
|---|---|---|
| 2,577,584 | Hofreiter | Dec. 4, 1951 |
| 2,827,618 | Chapman et al. | Mar. 18, 1958 |